United States Patent [19]
Loew et al.

[11] Patent Number: 5,259,549
[45] Date of Patent: Nov. 9, 1993

[54] METHOD TO ATTACH A PLATE TO A STEEL SUBSTRATE

[75] Inventors: Al C. Loew, Oak Park; James W. Ogilvy, Harper Woods, both of Mich.

[73] Assignee: The United States of Americas as represented by the Secretary of the Army, Washington, D.C.

[21] Appl. No.: 992,322

[22] Filed: Dec. 21, 1992

[51] Int. Cl.$^5$ ............................................. B23K 23/00
[52] U.S. Cl. ........................................ 228/198; 228/119; 228/234.3; 29/402.16
[58] Field of Search ............... 228/119, 135, 175, 198, 228/241; 29/402.16, 402.17

[56] References Cited

U.S. PATENT DOCUMENTS

| | | | |
|---|---|---|---|
| 3,070,874 | 1/1963 | Davis, Jr. | 228/241 |
| 3,711,019 | 1/1973 | Rulo | 228/241 |
| 4,062,485 | 12/1977 | Andersen | 228/241 |

FOREIGN PATENT DOCUMENTS 46-17565  5/1971  Japan ................................ 228/241

Primary Examiner—Samuel M. Heinrich
Attorney, Agent, or Firm—Peter A. Taucher; David L. Kuhn

[57] ABSTRACT

Shown is a method to attach a plate to a steel substrate. An iron or ferrous alloy disk is fixed at one end of a pipe and wafers of aluminum or other iron reducing agent are stacked in the pipe on the disk. An oxygen lance in the pipe starts a reaction in which the wafers, part of the disk and an adjoining portion of the substrate form a weld body. The weld body bonds to the disk and the substrate and mechanically locks the pipe to the substrate. A plate is placed on the substrate so that the pipe passes through a hole in the plate and then a fastener engaging the pipe is used to hold the plate on the substrate. Instead of the pipe, the plate can have a cavity holding the wafers and the plate can be placed on the substrate before using the oxygen lance. As before, metal from one end of the cavity, material from the wafers and material from the substrate form a weld body.

20 Claims, 3 Drawing Sheets

METHOD TO ATTACH A PLATE TO A STEEL SUBSTRATE

GOVERNMENT USE

The invention described herein may be manufactured, used and licensed by or for the U.S. Government for governmental purposes without payment to us of any royalty thereon.

BACKGROUND AND SUMMARY

One of the tasks encountered in modern warfare occurs when armored vehicles receive battle damage to armor plates covering their hulls and turrets. The armor must be repaired quickly and must be repaired effectively enough so that the vehicles can be used for combat.

We have devised a quick, effective method to attach plates to vehicle armor as an in-field, temporary repair of battle damage. The method eliminates the need for acetylene so that repairs to armor can be accomplished in battlefield areas where acetylene is not available or in areas where it is desired to avoid storing acetylene. Our method is also useful for any application where it is desired to affix a plate to a steel substrate.

A first version of our method includes fixing an iron or ferrous alloy disk at one end of a pipe. Wafers containing a reducing agent for oxides of iron are stacked in the pipe adjacent the disk. An ignited oxygen lance is inserted in the pipe and a reaction occurs wherein the wafers, part of the disk, and an adjoining part of the substrate form a weld body. This body is welded to the remainder of the disk and to the substrate, and the body is mechanically locked to both the pipe and the substrate. A repair plate is placed on the substrate so that the pipe passes through an aperture in the plate and then a fastener is placed the pipe so as to hold the repair plate onto the substrate. In the second version of our method, the plate has a cavity holding the wafers and the plate is placed directly on the substrate before introducing the oxygen lance into the cavity. Then metal from the end of the adjacent the substrate, material from the wafers and material from the substrate form a weld body in the same manner as described previously.

DETAILED DESCRIPTION

Figure 1:
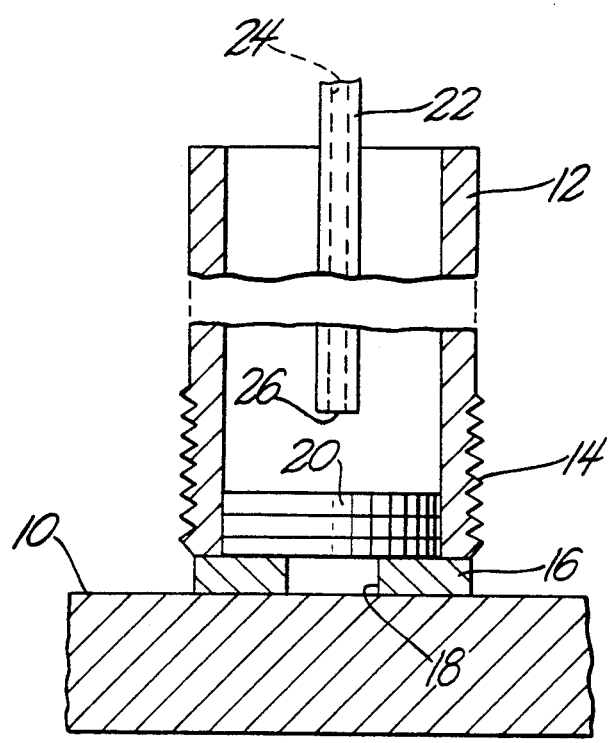
FIG. 1 is a cross-sectional view of an armor plate or other steel substrate together with a pipe to be attached to the plate by the first version of our method. Wafers in the pipe are not shown in cross section.

Shown in FIG. 1 is an apparatus used to attach a threaded member to an armor plate 10 so that plate 10 can be temporarily repaired according to our method. The apparatus includes an elongate round pipe 12 of steel or other ferrous alloy, the pipe having external threads 14. Welded or otherwise fixed to the lower end of pipe 12 is a flat, open toroid or disk 16 having a central aperture 18, the disk being made of iron or a ferrous alloy. Disk 16 preferably does not extend beyond the radially outermost part of pipe 12, and normally the outer diameter of disk 16 is in registry with the radially outermost part of pipe 12. For example, in FIGS. 1 and 2, it might be desired that the outer diameter of disk 16 extend radially outward as far as the crowns on threads 14. Of course, disk 16 may be formed integrally with pipe 12. It may preferred in some applications to magnitize disk 16 so that the disk will hold pipe 12 on an armor plate that is to be repaired. Pipe 12 may also be magnatized and disk 16 will conduct magnetic flux from the pipe so that, again, the disk will hold the pipe on an armor plate.

Extending into pipe 12 is an oxygen lance 22 defining passage 24 through which oxygen flows during the lance's operation. The lance is formed principally of iron, although carbon, nickel or other alloying materials may be present in the lance. During operation of the lance, oxygen flows therethrough and the lance terminus 26 burns in the presence of the oxygen, whereby the heat and flow of material from terminus 26 is conventionally used for cutting steel plates.

Inside pipe 12 in loose, face-to-face contact are aluminum wafers 20 whose diameter is approximately the same as the inner diameter of the pipe. Altenatively, the wafers can be comprised of titanium, silicon or other material that will act as a reducing agent for oxides of iron. The wafers will be oxidized very rapidly after lance 22 is ignited and introduced into pipe 12. The oxidizing wafers will add sufficient heat to the ongoing reactions to melt a portion of disk 16 adjacent aperture 18 and will reduce oxides of iron from the lance and disk. The terminus 26 of the oxgen lance is kept within pipe 12 so that an oxygen stream flows against wafers 20 until their oxidation and other reactions are complete.

The wafers are preferably relatively thin, the wafer thickness typically being between an eighth and a quarter of an inch, and the wafers preferably are in loose contact with the inner diametrical surface of pipe 12. The number of wafers 20 and the height of the wafer stack can be varied from one case to the next, depending on number of factors, such as, for example, the desired duration and intensity of heat to be produced by the ignited wafers. Wafers are preferred since the stream of material from lance 22 tends to keep wafers at the bottom of pipe 12 until their ignition, whereas pellets or powder may possibly be blown back out of pipe 12.

Figure 2:
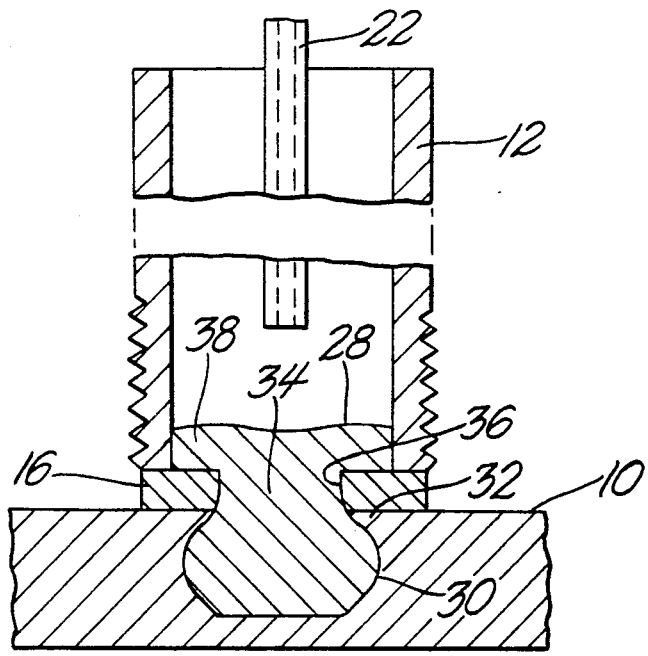
FIG. 2 is a cross sectional view of the plate and pipe of FIG. 1 after the pipe is affixed to the plate according to the first version of our method.

FIG. 2 shows pipe 12, disk 16 and armor plate 10 after wafers 20 have ceased burning wherein a weld body 28 has formed of iron, oxidized aluminum, oxides of iron, unoxidized aluminum and material from plate 10 that has melted and resolidified. Body 28 has a bulb-like projection 30 into plate 10 such that an undercut portion 32 of the plate is created adjacent the uneroded remainder of disk 16. Projection 30 has a weld bond with plate 10 an is physically locked to plate 10 by virtue of undercut portion 32 of plate 10. The portion of weld body 28 inside pipe 12 will be at least partly welded to the inner diameter of the pipe and will be welded at annular flange 38 to the portion of disk 16 faced into pipe 12. Neck 34 of body 28 will be welded at the now enlarged inner diametrical surface 36 of disk 16. It will be seen that body 28 is both welded to pipe 12 and is mechanically locked thereto by virtue of flange 38 and disk 16.

Figure 5:
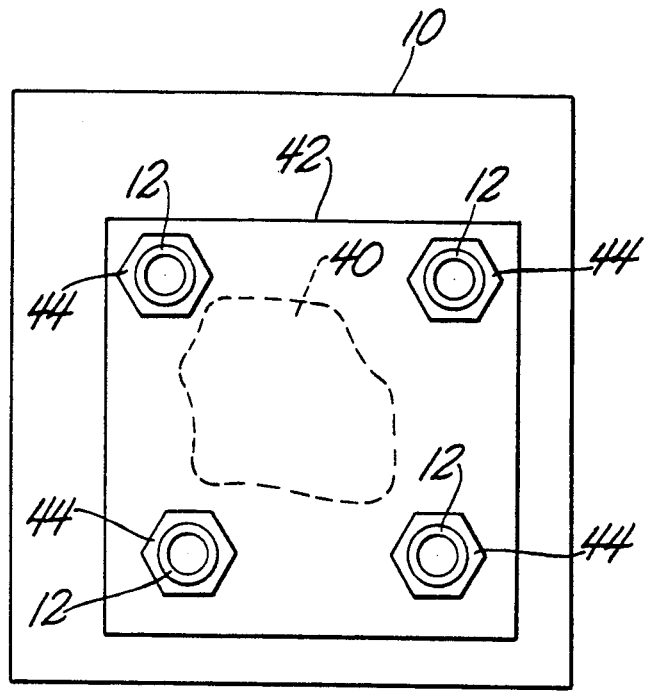
FIG. 5 is a plan view of a repair plate affixed to a damaged plate in accordance with the first version of our method.

Referring now to FIG. 5, a plurality of pipes 12 are attached in the previously described manner to plate 10 of an armored vehicle (not shown). Posts 12 are arranged in a post pattern about battle damage hole 40 in plate 12 and a repair plate 42 is provided with a set of through holes in a hole pattern complimentary to the post pattern. The through holes can be formed by cutting plate 10 with an oxygen lance, by drilling or by other suitable method. The diameter of the through holes is such that posts 12 closely and slidingly fit in the through holes. Preferably, disk 16 (FIGS. 1 and 2) is sized so that it also closely and slidingly fits in the through holes. Repair plate 42 is placed on plate 10 such that posts 12 protrude through the repair plate's holes and a portion of threads 14 extend beyond repair plate 42. Plate 42 is then secured to plate 10 by means of nuts 44 or other internally threaded fasteners.

Figure 3:
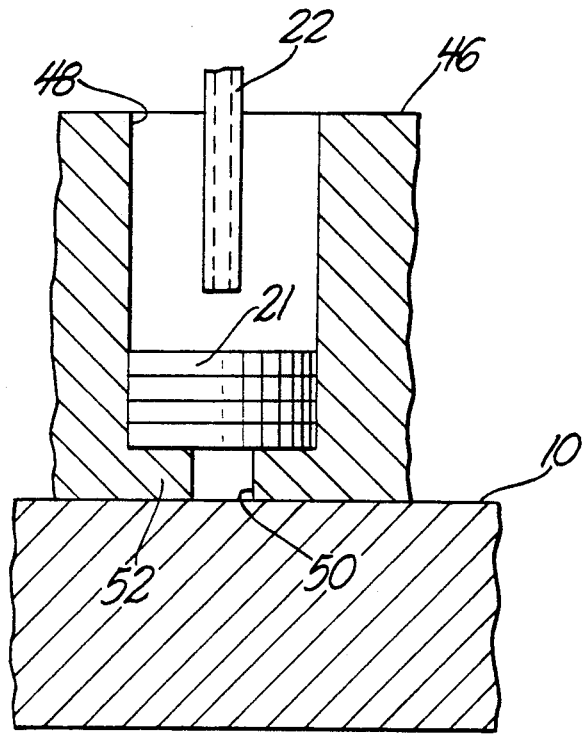
FIG. 3 is a cross sectional view of two plates to be fastened together according to a second version of our method, wafers in a cavity in one plate not being in cross section.

FIG. 3 shows structure associated with an alternate method of repairing battle damaged armor wherein a repair plate 46 is placed in face-to-face contact against armor plate 10, which is to be repaired. Plate 46 defines a stepped through bore having an elongate, larger diameter portion 48 and a smaller diameter portion 50. It may preferred to eliminate smaller diameter bore portion 50, whereby larger diameter portion 50 becomes a blind bore extending almost all the way through plate 46, and whereby the annular zone 52 between portion 48 and plate 10 becomes a disk shaped zone. Larger diameter portion 48 need not have a round cross section, and portion 48 may have instead a polygonal or irregular cross section. Likewise, smaller diameter portion 50 may have a polygonal or irregular cross section.

Inside larger diameter portion 48 is a group of wafers 21 of aluminum or other material having characteristics described previously. Wafers 21 preferably have outer peripheral shapes conforming to the inner peripheral surface of larger diameter portion 48 and are in loose contact with the inner peripheral surface. Wafers 21 are also in loose, face-to-face contact with one another.

Figure 4:
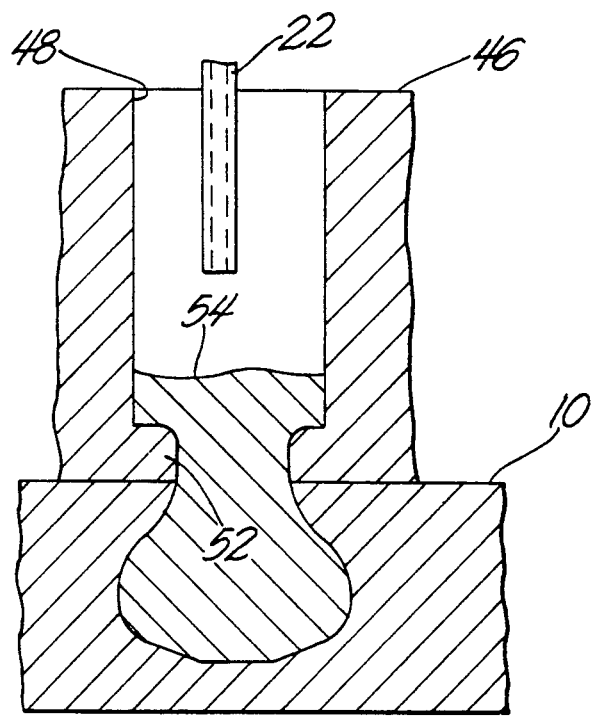
FIG. 4 is a cross sectional view of the plates of FIG. 3 after the plates are fastened together in accordance with the second version of our method.

After oxygen lance 22 ignites wafers 21, a weld body 56 in FIG. 4 will be formed in the same fashion as weld body 28 in FIG. 2. Weld body 54 is further similar to weld body 28 in that weld body 54 not only is welded to the peripheral surface of larger diameter portion 48 and to plate 10 but weld body 54 also mechanically locks plate 46 to plate 10.

Figure 6:
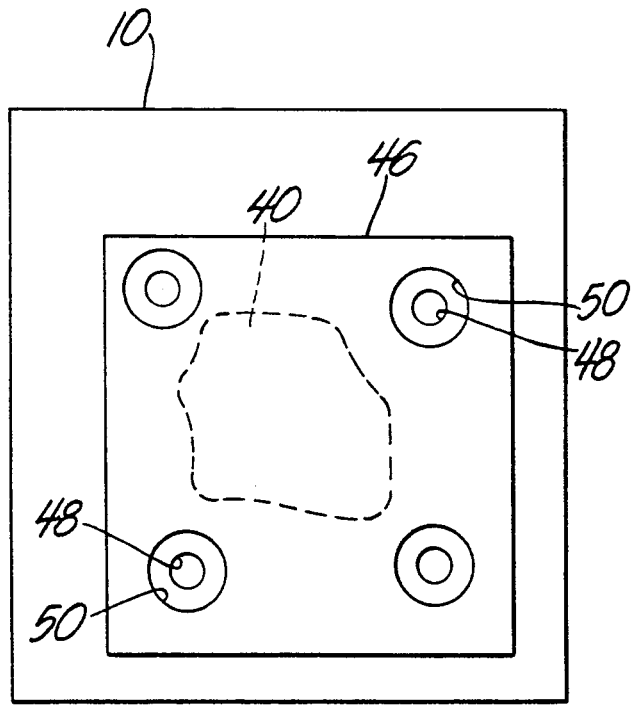
FIG. 6 is a plan view of a repair plate affixed to a damaged plate in accordance with the second version of our method.

FIG. 6 shows repair plate 46 in facial contact with plate 10, the latter plate defining battle damage hole 40. A set of stepped bores such as that shown in FIG. 4 are defined by plate 46 in a pattern about hole 40, each of the bores having the aforementioned larger diameter bore portion 48 and smaller diameter bore portion 50. Round disks 21 (not shown in FIG. 6) are placed in the bores and thereafter ignited so that plates 46 and 10 are joined as previously described.

We wish it to be understood that we do not desire to be limited to the exact details of construction shown and described herein since obvious modifications will occur to those skilled in the relevant arts without departing from the spirit and scope of the following claims.

We claim:

1. A method for attaching a plate to a steel substrate, comprising:
   providing an elongate hollow cylindrical element open at one end;
   at least partly enclosing an opposite end of the cylindrical element with a disk fixed on the element and comprised at least partly of iron;
   facing the disk against the steel substrate;
   placing one or more wafers in the element at the disk, the wafers having material therein that acts as a reducing agent for oxides of iron;
   introducing an ignited oxygen lance into the element so that the wafers begin to burn and melt;
   allowing the wafers to continue burning and melting until the wafers, a portion of the disk and a proximal zone of the steel substrate adjacent the disk unite to form a weld body projecting from within the element into the steel substrate;
   allowing the element, disk, weld body and proximal zone to cool, whereby the weld body is welded to the steel substrate and forms a mechanical lock between the element and the steel substrate;
   forming an aperture in the plate, the aperture's diameter sized to accommodate the cylindrical element;
   placing the plate on the substrate such that the cylindrical element passes through the aperture;
   engaging a fastener with the cylindrical element and the plate so that the plate is held on the substrate.

2. The method of claim 1 further including the steps of:
   diametrically sizing the wafers so that peripheries of the wafers fit closely but slidingly with an inner peripheral wall of the cylindrical element;
   placing the wafers in face-to-face relation when the wafers are in the cylindrical element.

3. The method of claim 1 wherein:
   a plurality of cylindrical elements are fixed to the steel substrate in a first array about a damaged area of the substrate;
   a plurality of the apertures are formed in the plate in a second array;
   the plate is placed against the substrate so that the elements of the first array extend through the apertures in the second array.

4. The method of claim 1 wherein the disk defines a central hole.

5. The method of claim 1 wherein the cylindrical element is a pipe having external threads on a section thereof.

6. The method of claim 1 wherein the wafers are aluminum wafers from one-eighth inch to one-quarter inch thick.

7. The method of claim 1 wherein:
   the weld body forms a bulb-like projection into the steel substrate;
   formation of the weld body creates an undercut zone in the substrate between the projection and the disk.

8. The method of claim 7 wherein:
   the weld body forms an annular flange inside the cylindrical element;
   the flange contacts a surface of the disk faced away from the substrate.

9. The method of claim 1 wherein the weld body welds to the disk.

10. The method of claim 9 wherein the weld body at least partly welds to an inner peripheral wall of the cylindrical element.

11. The method of claim 1 wherein magnetic flux in the disk holds the disk to the steel substrate.

12. A method for attaching a ferrous plate to a steel substrate, comprising:
   forming a cavity in the plate open at one side of the plate and extending toward an opposite side of the plate;
   leaving a flat zone of plate material between the cavity and the opposing side of the plate;
   facing the opposite side of the plate against the steel substrate;
   placing one or more wafers in the cavity at the flat zone, the wafers having a material therein acting as a reducing agent for oxides of iron;
   introducing an ignited oxygen lance into the cavity so that the wafers begin to burn and melt;
   allowing the wafers to continue burning and melting until the wafers, a portion of the flat zone and a proximal zone of the steel substrate adjacent the flat zone unite to form a weld body projecting from within the cavity into the steel substrate;
   allowing the flat zone, weld body and proximal zone to cool, whereby the weld body is welded to the steel substrate and forms a mechanical lock between the plate and the steel substrate.

13. The method of claim 12 further including the steps of: configuring the wafers so that peripheral edges of the wafers fit closely but slidingly with an inner peripheral wall of the cylindrical element; placing the wafers in face-to-face relation when the wafers are in the cavity.

14. The method of claim 12 wherein:
   a plurality of cavities are formed in the plate such that the cavities are next to a covering area of the plate;
   the plate is placed against the substrate so that the covering area of the plate is disposed over a damaged portion of the steel substrate.

15. The method of claim 12 wherein the flat zone defines a central hole.

16. The method of claim 12 wherein the wafers are aluminum wafers from one-eighth inch to one-quarter inch thick.

17. The method of claim 12 wherein:
   the weld body forms a bulb-like projection into the steel substrate;
   formation of the weld body creates an undercut zone in the substrate between the projection and the flat zone.

18. The method of claim 17 wherein:
   the weld body forms an annular flange inside the cavity;
   the flange contacts a surface of the flat zone faced away from the substrate.

19. The method of claim 12 wherein the weld body welds to the flat zone.

20. The method of claim 19 wherein the weld body at least partly welds to an inner peripheral wall of the cavity.

* * * * *